United States Patent
London et al.

(10) Patent No.: US 9,845,166 B2
(45) Date of Patent: Dec. 19, 2017

(54) PNEUMATIC CUBESAT PAYLOAD DEPLOYMENT SYSTEM UTILIZING LAUNCH VEHICLE TANK PRESSURE

(71) Applicant: Ventions, LLC, San Francisco, CA (US)

(72) Inventors: Adam P London, San Francisco, CA (US); Bevan Gerber-Siff, San Francisco, CA (US)

(73) Assignee: Ventions, LLC, San Francisco, CA (US)

( * ) Notice: Subject to any disclaimer, the term of this patent is extended or adjusted under 35 U.S.C. 154(b) by 346 days.

(21) Appl. No.: 14/726,896

(22) Filed: Jun. 1, 2015

(65) Prior Publication Data

US 2015/0353211 A1 Dec. 10, 2015

Related U.S. Application Data

(60) Provisional application No. 62/007,836, filed on Jun. 4, 2014.

(51) Int. Cl.
*B64G 1/64* (2006.01)
*B64G 1/40* (2006.01)

(52) U.S. Cl.
CPC .......... *B64G 1/645* (2013.01); *B64G 1/402* (2013.01); *B64G 1/641* (2013.01)

(58) Field of Classification Search
CPC .......... B64G 1/645; B64G 1/64; B64G 1/641; B64G 2001/643
See application file for complete search history.

(56) References Cited

U.S. PATENT DOCUMENTS

| | | | | |
|---|---|---|---|---|
| 3,460,209 A | * | 8/1969 | Modrey | B64G 1/641 24/603 |
| 4,632,339 A | * | 12/1986 | Yuan | B64G 1/645 244/173.3 |
| 5,217,188 A | * | 6/1993 | Thole | B64G 1/002 244/159.4 |

(Continued)

OTHER PUBLICATIONS

Nanoracks, NanoRacks CubeSat Deployer (NRCSD) Interface Control Document; Dec. 10, 2013. pp. 12-3, Uses separation Springs.

(Continued)

*Primary Examiner* — Christopher P Ellis
*Assistant Examiner* — Magdalena Topolski
(74) *Attorney, Agent, or Firm* — Keith L. Jenkins, Registered Patent Attorney, LLC; Keith L. Jenkins

(57) ABSTRACT

A rail-captive sled for deploying payloads into outer space from a space launch vehicle. The sled is driven by a piston, powered by residual tank pressure from a tank native to the space launch vehicle. The rails are arranged parallel and adapted to a cross-sectional shape of a payload, such as small satellites or cubesats. The sled is a box frame sled with an adaptation to receive the piston. The rails may be attached to the residual pressure tank, with the piston in the residual pressure tank and aligned to the rails, or the pressure may be drawn from tank plumbing to a cylinder specific to the piston. The rails have a releasable closure to avoid unplanned egress of the payload, and the closure locks in the open position once released. The piston may be constrained by a direct constraint or by the closure via the payload.

20 Claims, 10 Drawing Sheets

(56) References Cited

U.S. PATENT DOCUMENTS

| | | | |
|---|---|---|---|
| 6,513,760 B1 * | 2/2003 | Mueller | B64G 1/002 244/171.1 |
| 7,036,773 B2 | 5/2006 | Caldwell | |
| 2011/0056471 A1 * | 3/2011 | Kilvert | F41B 11/00 124/57 |
| 2011/0240802 A1 * | 10/2011 | Balinov | B64G 1/641 244/173.3 |
| 2012/0205488 A1 * | 8/2012 | Powell | B64C 39/024 244/63 |
| 2014/0319283 A1 | 10/2014 | Holemans et al. | |
| 2015/0151856 A1 * | 6/2015 | Reed | B64G 1/1078 244/158.4 |

OTHER PUBLICATIONS

O'Neill, J., Iss Astronauts Fire-Up Awesome 'Cubesat Cannon', Discovery News Nov. 21, 2013. p. 2, line 1: "spring-loaded".

* cited by examiner

PNEUMATIC CUBESAT PAYLOAD DEPLOYMENT SYSTEM UTILIZING LAUNCH VEHICLE TANK PRESSURE

CROSS REFERENCE TO RELATED APPLICATIONS

This application claims the benefit of U.S. Provisional patent application Ser. No. 62/007,836 filed Jun. 4, 2014 by the same inventors, the contents of which are incorporated herein by reference.

STATEMENT REGARDING FEDERALLY SPONSORED RESEARCH AND DEVELOPMENT

This invention was made with government support under contract FAA8650-12-C-7274 awarded by DARPA/AFRL. The government has certain rights in the invention. The research in this document is being developed by Ventions, LLC with funding from the Defense Advanced Research Projects Agency (DARPA). Distribution Statement A: Approved for Public Release, Distribution Unlimited.

FIELD OF ART

The present invention relates to deployment mechanisms for deploying satellites from launch vehicles in outer space. The present invention more particularly related to deploying very small satellites, such as pico-satellites or cubesats using residual tank pressure from tanks onboard the launch vehicle.

SUMMARY OF THE INVENTION

Briefly described the invention includes a deployment mechanism for deploying very small satellites (hereinafter "cubesats") from a launch vehicle. The deployment mechanism is piston-driven using residual tank pressure for a fuel, oxidizer, or pressurant gas onboard the launch vehicle along a set of rails using a captive sled.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
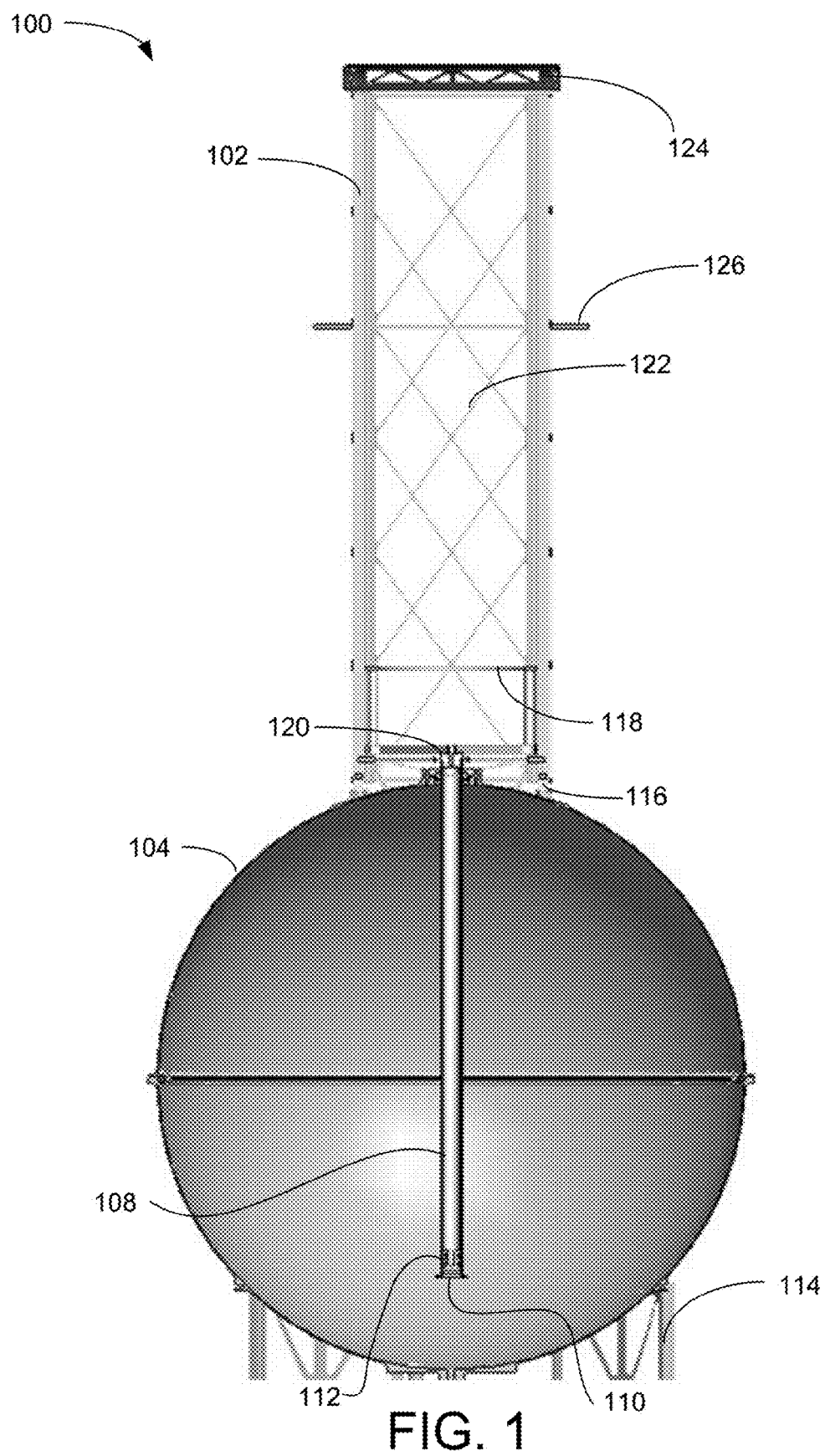
FIG. 1 is a side elevation view illustrating an exemplary embodiment of the pneumatic cubesat payload deployment system, according to a preferred embodiment of the present invention.

FIG. 1 is a side elevation partial x-ray view illustrating an exemplary embodiment of the pneumatic cubesat payload deployment system 100, according to a preferred embodiment of the present invention. While the examples herein are presented in regard to cubesats, various small satellite configurations may be deployed by the present invention with adaptation to the various shapes and sizes of the various small satellites. The pneumatic cubesat payload deployment system 100 includes rails 102 slidingly supporting sled 118 that is driven by residual pressure in tank 104 acting on hollow piston 108 inside tank 104. Piston 108, O-ring seals 112, and end cap 110 are inside tank 104. Tank 104 is supported on the launch vehicle structure 114. Rails 102 (two of four in this view, one of two visible labeled) extend from tank interface connectors 116 on tank 104 toward releasably latchable door 124. Rails 102 captively and slidingly support sled 118 to slide from proximate the tank 104 to the door 124 and be retained at that point. Rails 102 have cross-brace supports 122 for structural stability. Payload fairing standoff 126 supports the rails 102 during launch.

The door 124 is launched in the closed position, as shown, with cubesats 602, 604 and 606 (see FIG. 6) arranged along and between rails 102. Cubesats 602, 604 and 606 are pushed along rails 102 by sled 118, through the door 124 and into outer space. In a preferred embodiment, door 124 is biased open, but is latched closed by a releasable latch 410 (see FIG. 5) which is released by a control system to initiate deployment. In another embodiment, the door 124 is biased closed (by a spring, for example), and may be opened by the force of the cubesats 602, 604 and 606 being deployed overcoming the bias. The cubesats 602, 604 and 606 deploy out open door 124 (shown closed). In a preferred embodiment, pressure from tank 104 is applied via piston 108 before, during, and after launch. The force of piston 108 may be applied through the sled 118 to the cubesats to the door 124. The door 124 is releasably latched closed against the force transmitted through the cubesats 602, 604 and 606, and releasing the latch causes the door 124 to fly open and the cubesats to deploy into outer space. In another embodiment, the piston 108 may also be latched until deployment. One advantage of the present invention is that a pneumatic piston 108 attached to a pressurized tank 104 has a very flat force-vs-time curve through the stroke, particularly compared to a metal spring, thus reducing the peak deployment forces on the payload. Any pressurized source on board the launch vehicle 802 (see FIG. 8) may be used, including attitude control system fuel or pressurant gases for other purposes. Another advantage is that heavy mechanical deployment actuators are eliminated and replaced by an otherwise wasted resource, i.e. residual pressurized gas available at the end of the engine burn of a launch vehicle 802.

In another preferred embodiment, the piston 108 is latched against applying pressure to the sled 118 until it is time to deploy the cubesats 602, 604 and 606, when both piston 108 and door latches are released. In such an embodiment, the cubesats 602, 604 and 606 are preferably loaded before the tank 104 is pressurized, thereby providing a more benign ground handling environment that minimizes the chance of damage during loading. In yet another embodiment, piston 108 is not located within the tank 104, but is connected to the tank 104 via conduit, and a solenoid controlled valve in the conduit, for example, can be used to initiate deployment.

The interface between the sled 118 and the piston 108 will be described in more detail below.

Figure 2:
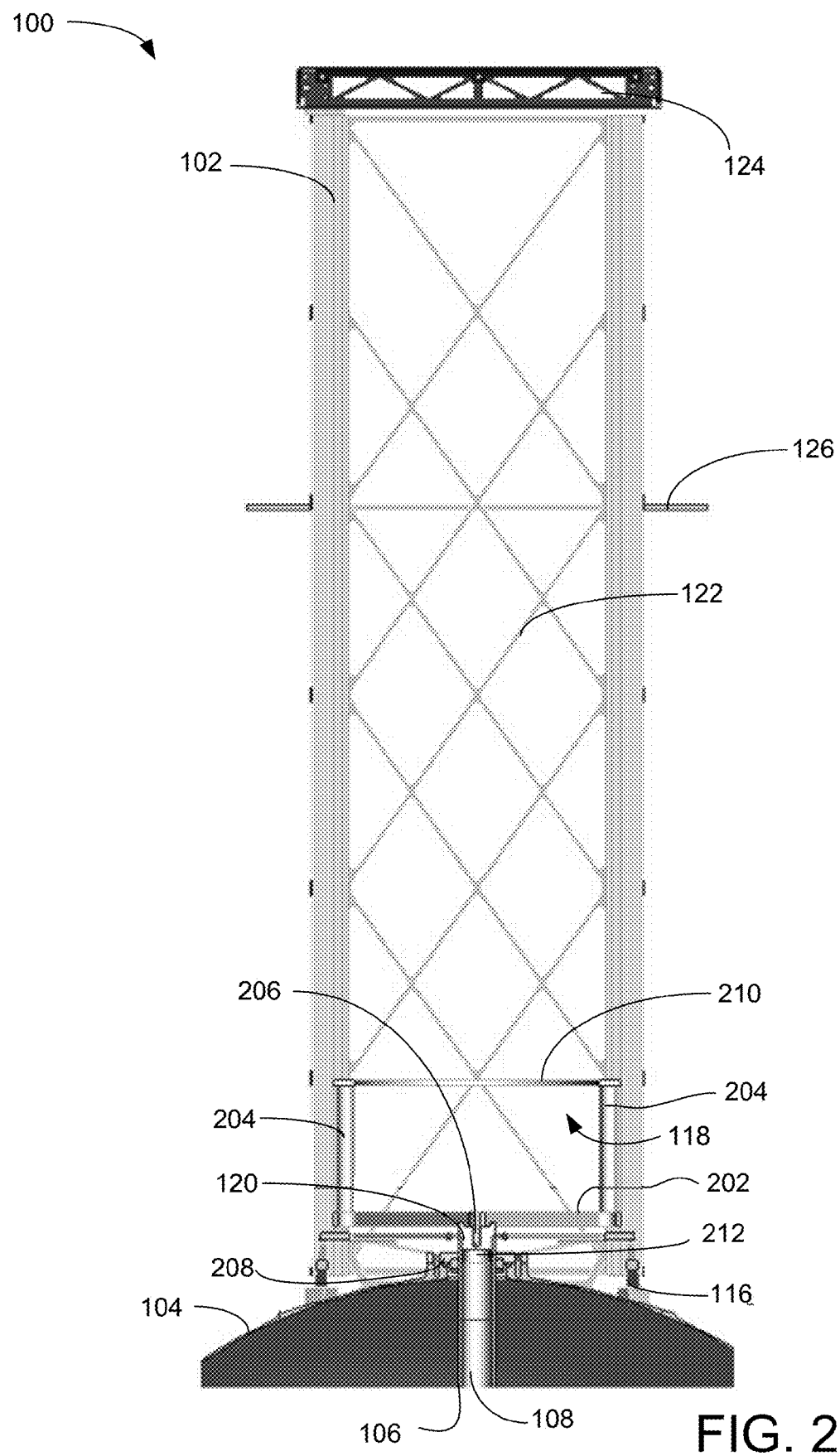
FIG. 2 is a partial right side elevation view illustrating an exemplary embodiment of the pneumatic cubesat payload deployment system of FIG. 1, according to a preferred embodiment of the present invention.

FIG. 2 is a partial right side elevation view illustrating an exemplary embodiment of the pneumatic cubesat payload deployment system 100 of FIG. 1, according to a preferred embodiment of the present invention. The interface between the sled 118 and the piston 108 includes an upper piston 108 chamber 120 above the piston head 212 into which a sled pin 206, such as a set screw, protrudes from a hub 408 (see FIG. 4) in the center of the bottom sled frame 202 to contact the top of the piston head 212. Sled 118 includes the four-sided, four cornered bottom sled frame 202 (one side visible in this view) having right circular cylindrical supports 204 (two visible in this view) extending normal to the bottom sled frame 202 from each corner and engaging and supporting a sled seat 210, upon which a cubesat 606 may rest. The corners of the bottom sled frame 202 and the sled seat 210 slidingly engage two inner edges 306 of the rails 102. Hollow piston 108 having a cylindrical wall 106 (shown in cross section) and a piston head 212 is sealed in the tank 104 using a sliding O-ring seal 208. In a particular embodiment, an additional two set screws (not shown) may be arranged in opposed horizontal position in piston 108 to clamp sled pin 206.

In another embodiment of the invention, the sliding o-ring seal 208 is replaced by a static face seal to prevent propellant leakage up to the point that the payload is ready to deploy. At the payload deployment juncture, the seal pre-load is released and a controlled gap between the piston 108 and its guide bore in the tank 104 is used to slow tank venting to the point that there is enough latent pressure to move the piston 108 forward.

Figure 3A:
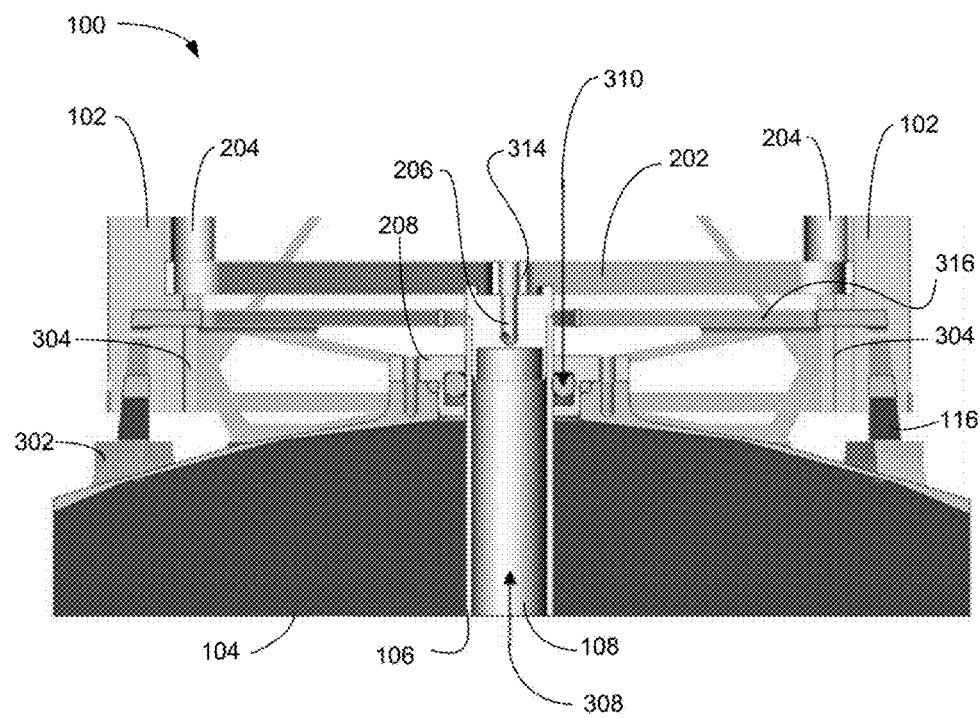
FIG. 3A is a detail right side elevation view illustrating an exemplary embodiment of the pneumatic cubesat payload deployment system of FIG. 1, according to a preferred embodiment of the present invention.

FIG. 3A is a detail right side elevation view illustrating an exemplary embodiment of the pneumatic cubesat payload deployment system 100 of FIG. 1, according to a preferred embodiment of the present invention. Connectors 116 connect rails 102 to tank protrusions 302 (one of two labeled). Rails 102 are coupled to supports 304. Bottom sled frame 202 rests on supports 304 when piston 108 is not extended. Bottom rail frame 316 is connected to supports 304 and to rails 102 and has a central opening for receiving a top portion of piston 108. Piston 108 is sealed, at its junction with the tank 104, by a sliding O-ring seal 208 having O-ring 310. Sled pin 206, illustrated as a set screw, is secured in bottom sled frame 202 within set screw cavity 316. In operation, piston 108 moves upward 308 pushing sled 118 via sled pin 206 to deploy cubesats 602, 604 and 606.

Figure 3B:
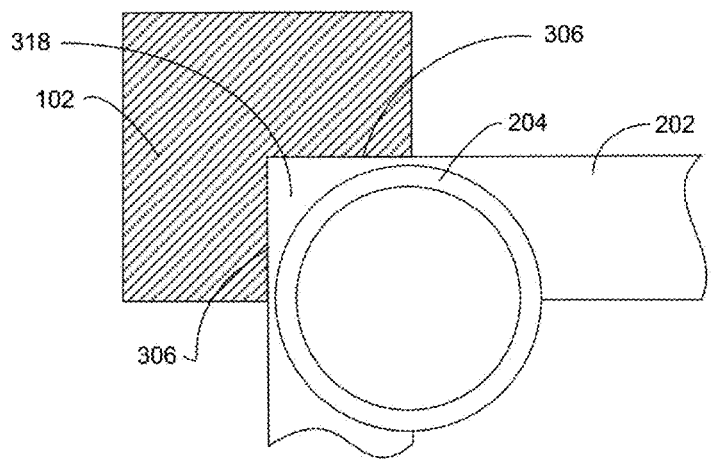
FIG. 3B is a detail cross-sectional view illustrating an exemplary detail of the exemplary embodiment of the pneumatic cubesat payload deployment system of FIG. 1, according to a preferred embodiment of the present invention.

FIG. 3B is a detail cross-sectional view illustrating an exemplary detail of the exemplary embodiment of the pneumatic cubesat payload deployment system 100 of FIG. 1, according to a preferred embodiment of the present invention. Rail 102 has an L-shaped cross section, as shown, and a corner of bottom sled frame 202 is received in inner corner of the L by rail surfaces 306. Cylindrical support 204 preferably does not engage the rails 102.

Figure 4:
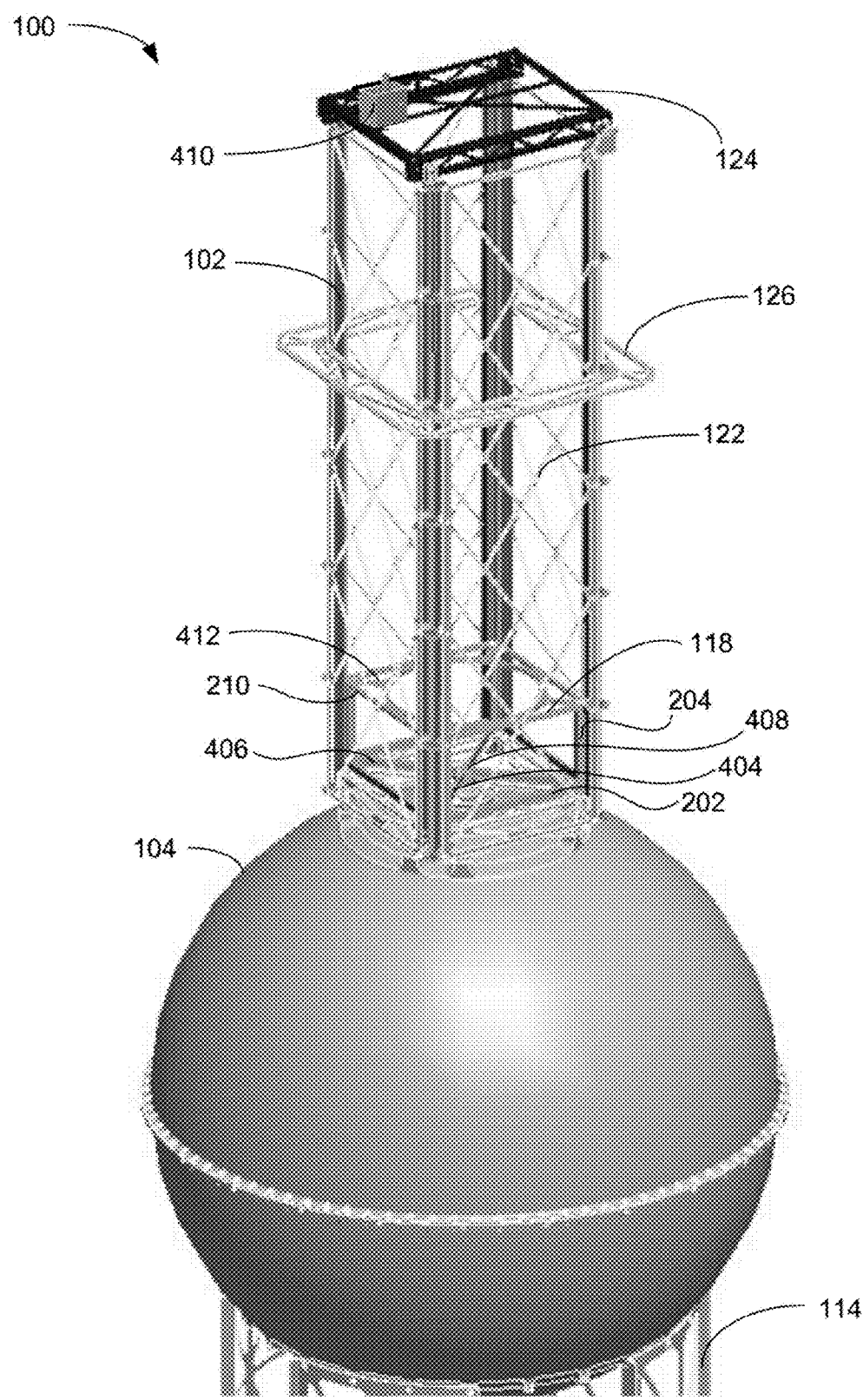
FIG. 4 is a perspective view illustrating an exemplary embodiment of the pneumatic cubesat payload deployment system of FIG. 1, according to a preferred embodiment of the present invention.

FIG. 4 is a perspective view illustrating an exemplary embodiment of the pneumatic cubesat payload deployment system 100 of FIG. 1, according to a preferred embodiment of the present invention. Bottom sled frame 202 can be more clearly seen to include cross members 404 and 406 meeting at central hub 408 and three of the four cylindrical supports 204 can be seen. Sled seat 210 can be seen to have an interior support structure 412, making the sled 118 as a whole a dimensionally stable box that can maintain shape and structural integrity during launch and deployment. The sizing of the sled 118 and the spacing between rails 102 is responsive to dimensional standards established for cubesats 602, 604 and 606. In various embodiments, various other standards for other types of small satellites may be used. Releasable latch 410, which may be, for example, a bolt cutter, is shown mounted on door 124.

Figure 5:
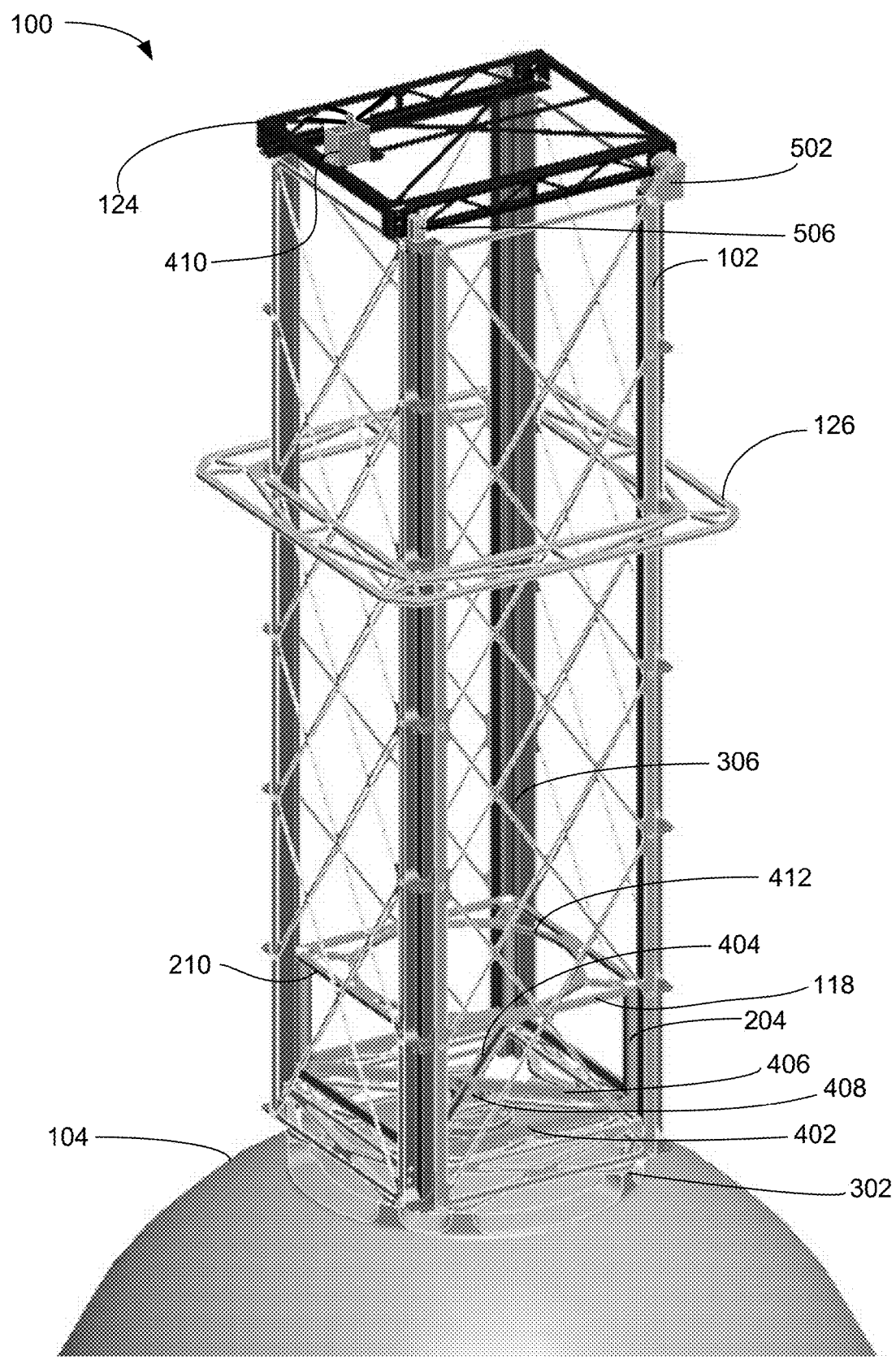
FIG. 5 is a detail of the perspective view illustrating an exemplary embodiment of the pneumatic cubesat payload deployment system of FIG. 1, according to a preferred embodiment of the present invention.

FIG. 5 is a detail of the perspective view illustrating an exemplary embodiment of the pneumatic cubesat payload deployment system 100 of FIG. 1, according to a preferred embodiment of the present invention. Spring-loaded hinge 502 couples door 124 to rails 102. Hinge 502 contains a pin-détente locking mechanism to lock the door 124 in the open position after the latch 410 is released, preventing interference with the cubesat 602, 604 and 606 deployment. Releasable latch 410 may be used to additionally secure the door in a closed position, as discussed above. Pins 506, which are mounted to opposing sides of door 124 at ends opposing the hinges 502, enter sockets 804 (see FIG. 8) in the tops of rails 102 to enable using the door 124 to provide additional structural stability during launch.

Figure 6:
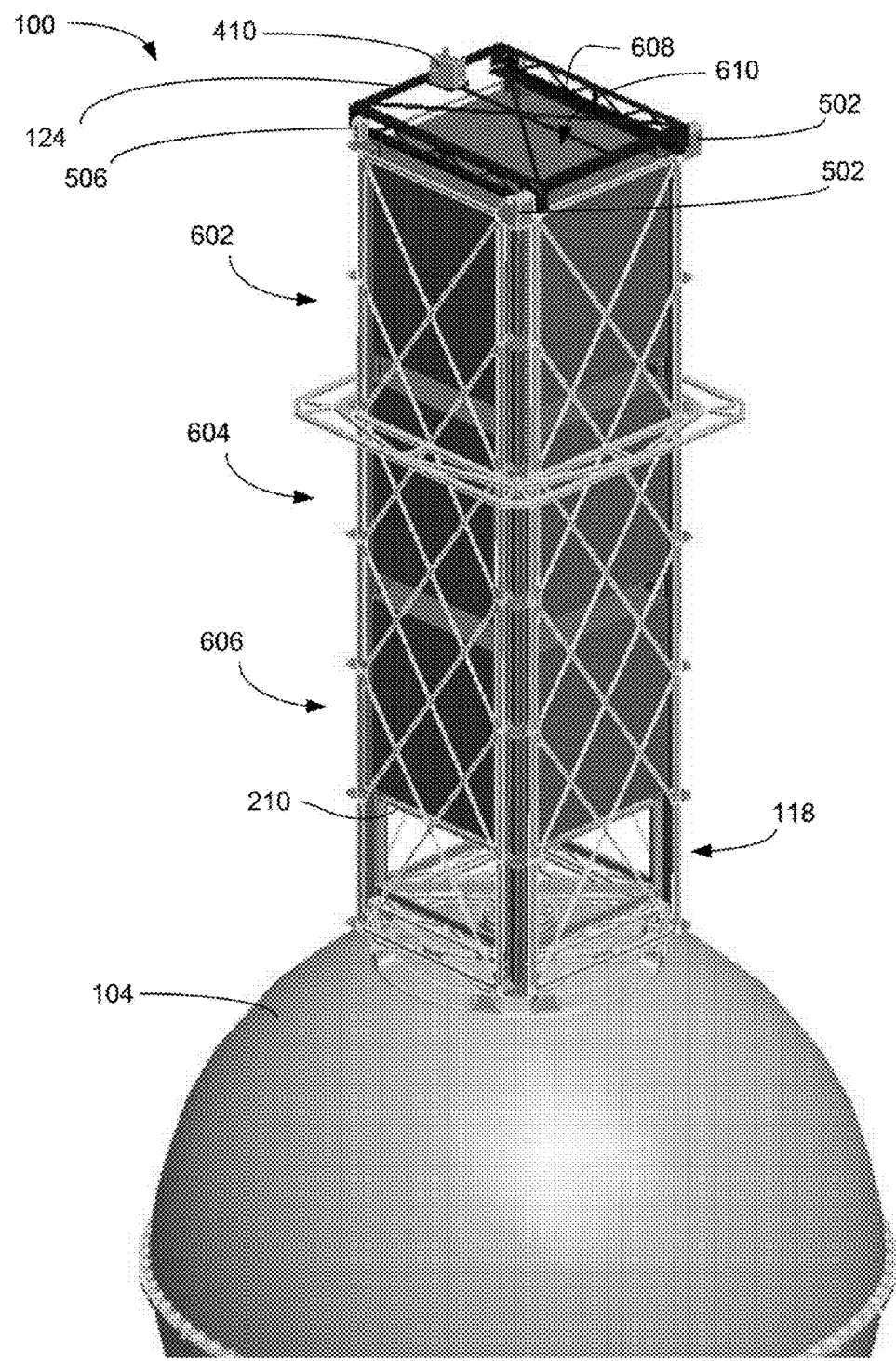
FIG. 6 is a perspective view illustrating an exemplary embodiment of the pneumatic cubesat payload deployment system of FIG. 1 with cubesats loaded, according to a preferred embodiment of the present invention.

FIG. 6 is a perspective view illustrating an exemplary embodiment of the pneumatic cubesat payload deployment system 100 of FIG. 1 with cubesats 602, 604 and 606 loaded, according to a preferred embodiment of the present invention. Cubesat 606 rests on sled seat 210, cubesat 604 rests on cubesat 604, and cubesat 602 rests on cubesat 604. In a preferred embodiment, pressure is applied to piston 108 to force cubesats 602, 604 and 606 together and to force top surface 610 of cubesat 602 against door 124 along the truss sides 608 (one of two labeled). This same embodiment may be used to deploy one double-length cubesat (not shown, but like a combined cubesat 606 and 604) and one single length cubesat 602, or to deploy one triple-length cubesat (not shown, but like combined cubesats 602, 604 and 606). In another preferred embodiment, the piston 108 is also latched until deployment.

Figure 7:
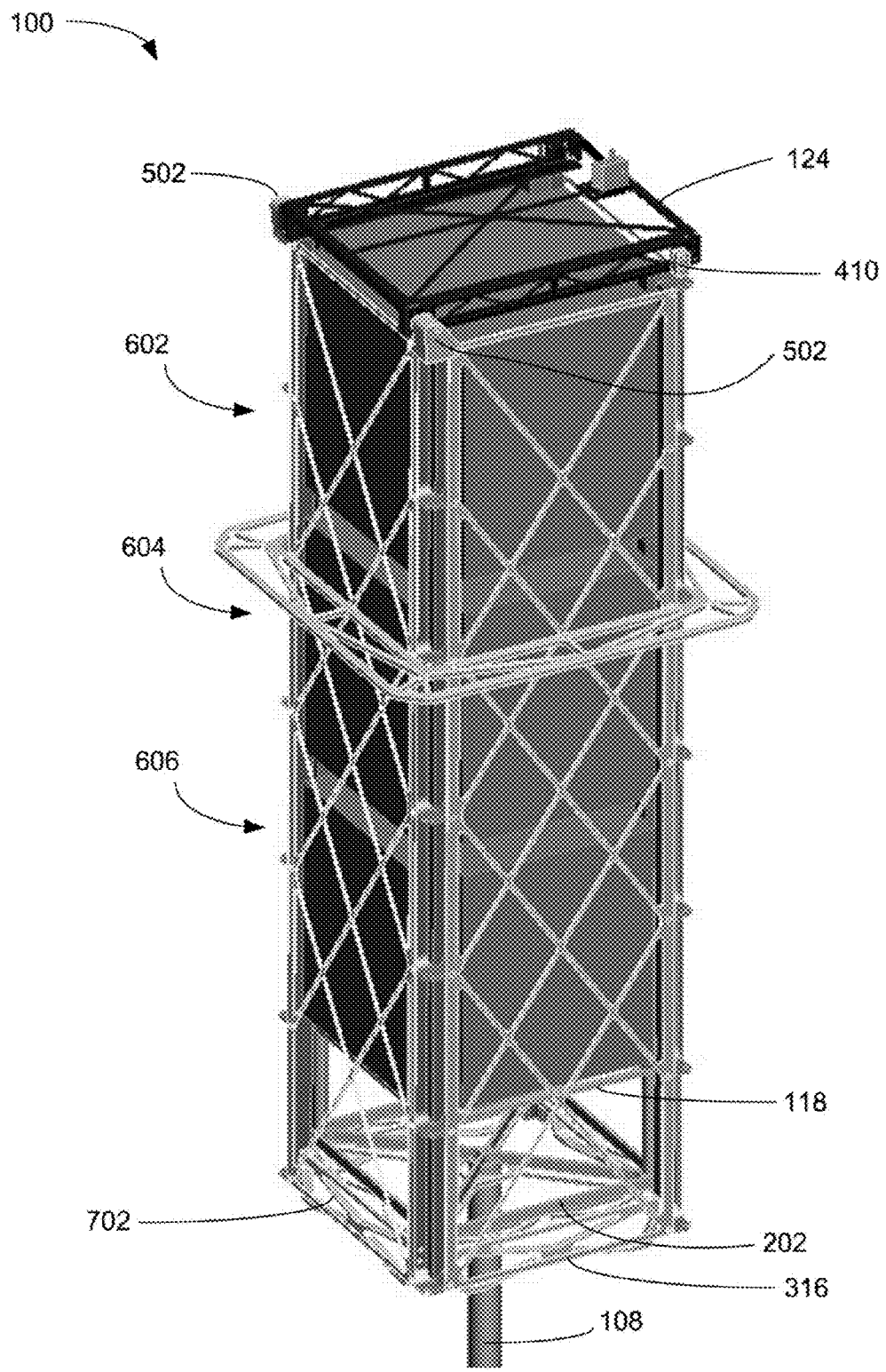
FIG. 7 is a perspective view illustrating an exemplary embodiment of the pneumatic cubesat payload deployment system of FIG. 1 with cubesats loaded, according to a preferred embodiment of the present invention.

FIG. 7 is a perspective view illustrating an exemplary embodiment of the pneumatic cubesat payload deployment system 100 of FIG. 1 with cubesats 602, 604 and 606 loaded, according to a preferred embodiment of the present invention. The reverse side of pneumatic cubesat payload deployment system 100 is shown, as compared to FIG. 6. Tank 104 is omitted, making the interior supports 702 in bottom rail frame 316 more easily viewed.

Figure 8:
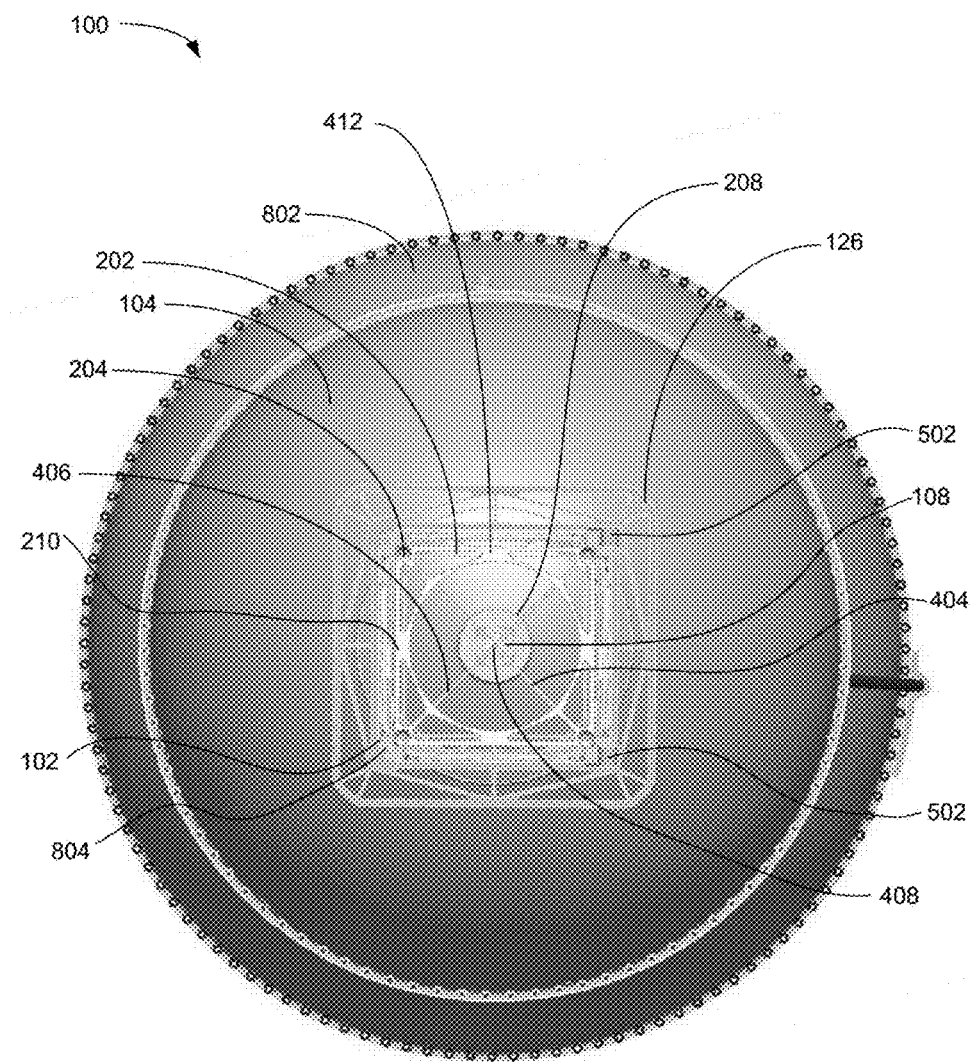
FIG. 8 is a top plan view illustrating an exemplary embodiment of the pneumatic cubesat payload deployment system of FIG. 1 with the door removed, according to a preferred embodiment of the present invention.

FIG. 8 is a top plan view illustrating an exemplary embodiment of the pneumatic cubesat payload deployment system 100 of FIG. 1 with the door 124 removed, according to a preferred embodiment of the present invention. Tank 104 is connected to launch vehicle 802. Both spring-loaded hinges 502 can be seen. Latch sockets 804 (one of two labeled) can be seen in the tops of two of the rails 102. Looking down, the interior support structure 412 of sled seat 210, as well as the cross members 404 and 406 and hub 408 of the bottom rail frame 210 can be seen. The top ends of the cylindrical sled supports 204 are visible, as are the spring-loaded hinges 502 and latch sockets 804. The top of sliding O-ring seal 208 can also be seen.

Figure 9:
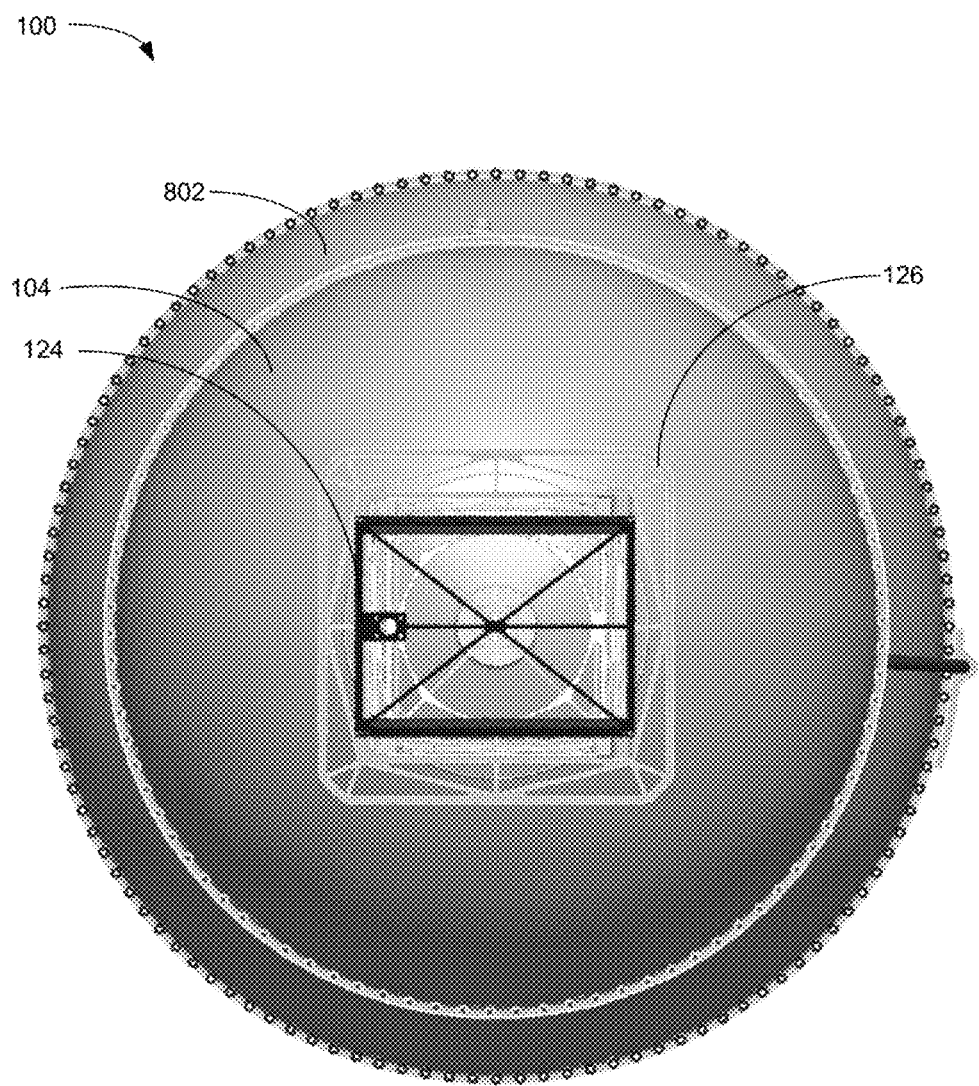
FIG. 9 is a top plan view illustrating an exemplary embodiment of the pneumatic cubesat payload deployment system of FIG. 1 with the door present and closed, according to a preferred embodiment of the present invention.

FIG. 9 is a top plan view illustrating an exemplary embodiment of the pneumatic cubesat payload deployment system 100 of FIG. 1 with the door 124 present and closed, according to a preferred embodiment of the present invention. The drawing is otherwise the same as FIG. 8. The releasable latch 410 is not shown in this view.

Figure 10:
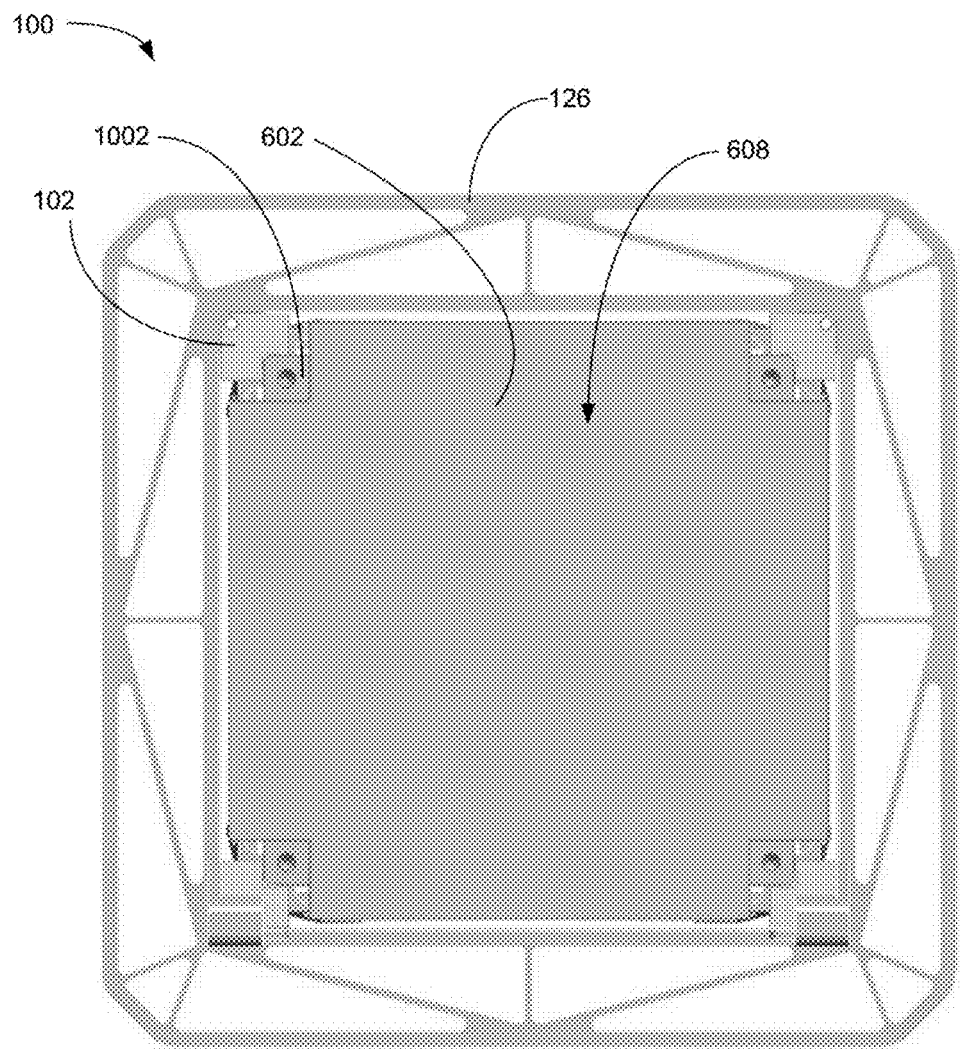
FIG. 10 is a top plan view illustrating an exemplary embodiment of the pneumatic cubesat payload deployment system of FIG. 1 with cubesats loaded, according to a preferred embodiment of the present invention.

FIG. 10 is a top plan view illustrating an exemplary embodiment of the pneumatic cubesat payload deployment system 100 of FIG. 1 with cubesats 602, 604 and 606 loaded, according to a preferred embodiment of the present invention. Door 124 is omitted for clarity of the drawing. The top surface 608 of cubesat 602 is shown in the pre-deployment position. Cubesat sliders 1002 (one of four labeled) are part of the cubesat 602 and are configured to fit and slide within rails 102 (one of four labeled). The diagonally outward corner of each cubesat slider 1002 is rounded to reduce friction with the rails 102. Those of skill in the art, enlightened by the present disclosure, will be aware of various strategies for reducing friction between the rails 102 and the cubesat sliders 1002 while maintaining constraint in the direction of travel and avoiding binding between the sliders 1002 and the rails 102.

We claim:

1. A satellite payload deployment system, comprising:
   a. a plurality of parallel rails attachable to extend from a space launch vehicle and arranged to define an interior space adapted to a cross-sectional shape of a payload;
   b. a captive sled within said interior space, operable to:
      i. slide on said plurality of rails in a direction parallel to said plurality of rails and
      ii. support at least one said payload;
   c. a piston operable to propel said captive sled and said at least one payload from a proximal end of said plurality of rails to a distal end of said plurality of rails; and
   d. a receiver coupled to said piston and operable to
      i. couple to a source of residual tank pressure from a tank native to said space launch vehicle; and
      ii. transfer said residual tank pressure to said piston; and
   e. wherein said receiver comprises said source of residual tank pressure from said tank native to said space launch vehicle, further comprising:
      i. a reinforced opening in said tank; and
      ii. a sliding O-ring seal, installed in said opening, surrounding said opening and operable to seal said piston when said tank is pressurized.

2. The system of claim 1, comprising a releasably latchable door operable to releasably close said distal end of said plurality of rails to egress of said payload.

3. The system of claim 2, comprising a constraint to maintain said door in a fully opened configuration after said door latch has been released.

4. The system of claim 1, comprising a payload fairing standoff extending from said plurality of rails.

5. The system of claim 1, wherein said plurality of rails comprises four rails defining an interior space adapted to at least one cubesat.

6. The system of claim 1, wherein said captive sled comprises a box frame structure configured to engage said plurality of rails at a plurality of corners of said box frame structure.

7. The system of claim 1, further comprising said plurality of rails attached to said tank and aligned parallel to said piston.

8. The system of claim 1, wherein said receiver comprises:
   a. a piston cylinder slidingly and sealingly housing said piston;
   b. said piston cylinder aligned to said plurality of rails;
   c. a pressure conduit comprising a first end coupled to said cylinder; and
   d. a second end of said pressure conduit having a coupling operable to fluidically couple to a plumbing element of a-said tank native to said space launch vehicle.

9. The system of claim 1, further comprising a releasable constraint on said piston.

10. The system of claim 1, wherein said sled further comprises a sled pin extending from a proximal exterior center of said sled and operable to engage a head of said piston.

11. A satellite payload deployment system, comprising:
    a. a plurality of parallel rails attachable to extend from a space launch vehicle and arranged to define an interior space adapted to a cross-sectional shape of a payload;
    b. a captive sled within said interior space, operable to:
       i. slide on said plurality of rails in a direction parallel to said plurality of rails; and
       ii. to support at least one said payload;
    c. a piston operable to propel said captive sled and said at least one payload from a proximal end of said plurality of rails to a distal end of said plurality of rails;
    d. a receiver coupled to said piston and operable to:
       i. couple to a source of residual tank pressure from a tank native to said space launch vehicle; and
       ii. transfer said residual tank pressure to said piston;
    e. a releasably latchable door operable to releasably close said distal end of said plurality of rails to egress of said payload;
    f. wherein said receiver comprises said source of residual tank pressure from said tank native to said space launch vehicle, further comprising:
       i. a reinforced opening in said tank; and
       ii. a sliding O-ring seal, installed in said opening, surrounding said opening and operable to seal said piston when said tank is pressurized.

12. The system of claim 11, comprising a constraint to maintain said door in a fully opened configuration after said door latch has been released.

13. The system of claim 11, wherein said plurality of rails comprises four rails defining an interior space adapted to at least one cubesat.

14. The system of claim 11, wherein said captive sled comprises a box frame structure configured to engage said plurality of rails at a plurality of corners of said box frame structure.

15. The system of claim 11, wherein said receiver comprises:
    a piston cylinder slidingly and sealingly housing said piston, further comprising:

a. said cylinder aligned to said plurality of rails;
b. a pressure conduit comprising a first end coupled to said cylinder; and
c. a second end of said pressure conduit having a coupling operable to fluidically couple to a plumbing element of said tank native to said space launch vehicle.

16. The system of claim 15, further comprising said plurality of rails attached to said tank and aligned parallel to said piston.

17. A satellite payload deployment system, comprising:
a. a plurality of parallel rails attachable to extend from a space launch vehicle and arranged to define an interior space adapted to a cross-sectional shape of a payload;
b. a captive sled within said interior space, operable to:
   i. slide on said plurality of rails in a direction parallel to said plurality of rails; and
   ii. to support at least one said payload;
c. a piston operable to propel said captive sled and said at least one payload from a proximal end of said plurality of rails to a distal end of said plurality of rails;
d. a receiver coupled to said piston and operable to:
   i. couple to a source of residual tank pressure from a tank native to said space launch vehicle; and
   ii. transfer said residual tank pressure to said piston;
e. a releasably latchable door operable to releasably close said distal end of said plurality of rails to egress of said payload; and
f. a constraint to maintain said door in a fully opened configuration after said door latch has been released;
g. wherein said receiver comprises said source of residual tank pressure from said tank native to said space launch vehicle, further comprising:
   i. a reinforced opening in said tank;
   ii. a sliding O-ring seal, installed in said opening, surrounding said opening and operable to seal said piston when said tank is pressurized.

18. The system of claim 17, wherein said receiver comprises a piston cylinder slidingly and sealingly housing said piston, further comprising:
   i. said cylinder aligned to said plurality of rails;
   ii. a pressure conduit comprising a first end coupled to said cylinder; and
   iii. a second end of said pressure conduit having a coupling operable to fluidically couple to a plumbing element of a pressurized tank on said space launch vehicle.

19. The system of claim 18, wherein said captive sled comprises a box frame structure configured to engage said plurality of rails only at a plurality of corners of said box frame structure.

20. A satellite payload deployment system, comprising:
a. a plurality of parallel rails attachable to extend from a space launch vehicle and arranged to define an interior space adapted to a cross-sectional shape of a payload;
b. a captive sled within said interior space, operable to: i. slide on said plurality of rails in a direction parallel to said plurality of rails; and ii. to support at least one said payload;
c. a piston moveable in response to residual tank pressure from a tank native to the space launch vehicle when fluidically connected thereto; and
d. a payload interface coupled to said piston;
e. a receiver coupled to said piston and operable to i. couple to a source of residual tank pressure from the tank native to said space launch vehicle; and ii. transfer said residual tank pressure to said piston; and
f. wherein said receiver comprises said source of residual tank pressure from said tank native to said space launch vehicle, further comprising: i. a reinforced opening in said tank; and ii. a sliding O-ring seal, installed in said opening, surrounding said opening and operable to seal said piston when said tank is pressurized.

* * * * *